United States Patent [19]

Yamashina et al.

[11] Patent Number: 4,985,861

[45] Date of Patent: Jan. 15, 1991

[54] HIGH SPEED DIGITAL SIGNAL PROCESSOR FOR SIGNED DIGIT NUMBERS

[75] Inventors: Masakazu Yamashina; Hachiro Yamada; Tadayoshi Enomoto, all of Tokyo, Japan

[73] Assignee: NEC Corporation, Tokyo, Japan

[21] Appl. No.: 302,346

[22] Filed: Jan. 27, 1989

[30] Foreign Application Priority Data

Jan. 29, 1988 [JP] Japan .................................. 63-20592

[51] Int. Cl.[5] .......................... G06F 7/00; G06F 15/00
[52] U.S. Cl. .............................. 364/746.2; 364/750.5; 364/754
[58] Field of Search ................... 364/746.2, 750.5, 759, 364/768; 341/56, 57

[56] References Cited

U.S. PATENT DOCUMENTS

| 4,628,472 | 12/1986 | Fensch ................................. 364/760 |
| 4,838,646 | 6/1989 | Lasher et al. ....................... 364/713 |
| 4,864,528 | 9/1989 | Nishiyama et al. ................. 364/754 |
| 4,873,660 | 10/1989 | Nishiyama et al. ................. 364/768 |
| 4,878,192 | 10/1989 | Nishiyama et al. ................. 364/768 |

OTHER PUBLICATIONS

Miller et al., "Ternary Adder", RCA Technical Notes pp. 1-3, TN #510, Mar., 1962.
Arango et al., "A Fast Carry-Propagation Circuit for Base 3 Non-Redundant Arithmetic", IEEE Trans. on Electronic Computers, Apr., 1966.
Maholick et al., "Ternary Full Adder", IBM Technical Disclosure Bulletin, vol. 18, #4, pp. 1145-1146, Sep., 1975.
Kuninobu et al., "Design of a High Speed MOS Multiplier and Divider Using Redundant Binary Representation", Proc. 8th Symposium on Computer Arithmetic, pp. 80-86, May, 1987.
Harata et al., "High Speed Multiplier Using a Redundant Binary Adder Tree", IEEE International Conf. on Computer Design, pp. 165-170, 1984.

Primary Examiner—Dale M. Shaw
Attorney, Agent, or Firm—Foley & Lardner, Schwartz, Jeffery, Schwaab, Mack, Blumenthal & Evans

[57] ABSTRACT

For improvement in processing speed, a high-speed digital signal processor has a feedback loop from a register which stores the calculating result produced by a Signed Digit (SD) arithmetic unit to one of the input ports of the SD arithmetic unit. The SD arithmetic unit executes an arithmetic operation on an input digital signal and the arithmetic result is formed of both signed digit numbers without the need to convert the calculation result represented by an SD number into a binary number.

11 Claims, 6 Drawing Sheets

FIG. 1
PRIOR-ART

FIG. 2A
PRIOR-ART $( 0\ \ 0\ \ 1\ \ 1\ \ 1\ )_2 = A = (7)_{10}$ $+\ ( 1\ \ 0\ \ 0\ \ 0\ \ 1\ )_2 = B = (-15)_{10}$ $( 1\ \ 1\ \ 0\ \ 0\ \ 0\ )_2\quad S = (-8)_{10}$ $\qquad\quad 1\ \ 1\ \ 1 \qquad C1$

FIG. 2B
PRIOR-ART $( 0\ \ 0\ \ 1\ \ 1\ \ 1\ )_{SD} = A = (7)_{10}$ $+\ (-1\ \ 0\ \ 0\ \ 0\ \ 1\ )_{SD} = B = (-15)_{10}$ $(-1\ \ 0\ -1\ -1\ \ 0\ )_{SD}$ INTERMEDIATE SUM $+\ ( 0\ \ 0\ \ 1\ \ 1\ \ 1\ )_{SD}$ INTERMEDIATE CARRY $(-1\ \ 1\ \ 0\ \ 0\ \ 0\ )_{SD}\quad S = (-8)_{10}$

FIG. 3
PRIOR-ART

HIGH SPEED DIGITAL SIGNAL PROCESSOR FOR SIGNED DIGIT NUMBERS

FIELD OF THE INVENTION

This invention relates to a high speed digital signal processor and, more particularly, to a high speed digital signal processor capable of executing an arithmetic operation on signed digit numbers.

BACKGROUND OF THE INVENTION

Figure 1:
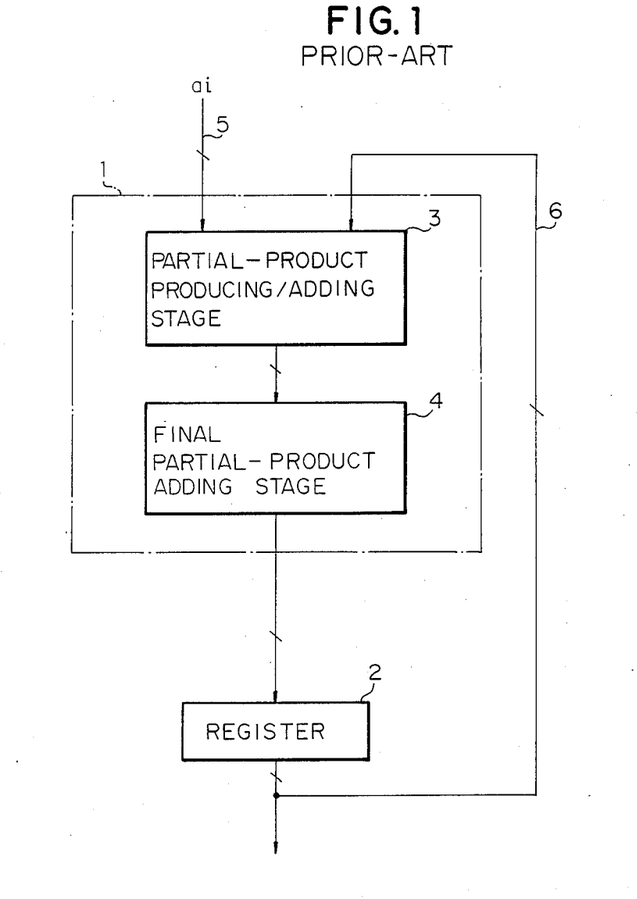
FIG. 1 is a block diagram showing the arrangement of a prior-art digital signal processor.

A typical example of the digital signal processor is illustrated in FIG. 1 of the drawings. The digital signal processor shown in FIG. 1 largely comprises a binary multiplier 1 and a register 2, and the binary multiplier is provided with a partial-product producing and adding stage 3 and a final partial-product adding stage 4. A time series multi-bit input signal $a_i$ is supplied from input signal lines 5 to one of the input ports of the partial-product producing and adding stage 3. In the following description, the suffix i is assumed to be incremented by time. To the other input port of the partial-product producing and adding stage 3 is fed back a product from the register 2 through feedback lines 6 which is the product of the time series multi-bit input signals $a_1$ to $a_{i-1}$.

The digital signal processor thus arranged is capable of executing the calculation represented by Equation 1.

$$P_n = ((\ldots(a_0 \times a_1) \times a_2) \times \ldots) \times a_{n-1}) \times a_n \quad \text{(Eq. 1)}$$

where $P_n$ is the product from the multi-bit input signal $a_0$ to the multi-bit input signal $a_n$.

In order to achieve a high speed calculation, it is preferable to reduce the number of the partial products, because the partial-product producing and adding stage 3 consumes a substantial amount of time. For reduction in the number of partial products, the calculation may be executed in accordance with Booth's Algorithm described by Rubinfield, L. P. in "A Proof of the Modified Booth's Algorithm for Multiplication", IEEE Transactions on Computers, vol. C-24, No. 10, October 1975, pages 1014 to 1015. It is also preferable to employ a parallel adding operation in accordance with the Wallace tree described in High-Speed Calculation Techniques for Computer, pages 168 to 173, published by Modern Science Corporation, or in Microelectronics Journal vol. 14, No. 6, 1983, pages 49 to 57, published by Benn Electronics Publication Ltd, Luton.

The final partial-product adding stage 4 is also causative of the substantial amount of time consumption due to propagation of a carry signal from digit to digit in the direction toward the high order side. One of the solutions is the employment of carry look ahead techniques, and the carry look ahead techniques are described in, for example, High-Speed Calculation Techniques for Computer, pages 85 to 92, published by Modern Science Corporation. Even if the carry look ahead techniques are employed in a processor, it is impossible to decrease the propagation time period to zero. In general, the total time period D4 consumed in the calculation of Equation 1 is represented by Equation 2:

$$D4 = n \times (T1 = T2) \quad \text{(Eq. 2)}$$

where T1 is a processing time period consumed by the partial-product producing and adding stage 3 and T2 is a processing time period consumed by the final partial-product adding stage 4. The processing time period T1 is capable of reduction by using the Wallace tree or the Booth's algorithm, and the processing time period T2 is able to be decreased by using the carry look ahead techniques as described hereinbefore.

Another approach is proposed as the application of SD numbers (Signed Digit numbers) in IEEE Journal of Solid-State Circuits, vol. SC-22, No. 1, February 1987, pages 28 to 34. In an ordinary m-ary system, each number is represented by using m positive integers such as $(0, 1, \ldots, m-1)$, however, the identical number is represented in the SD number system by using $(2m-1)$ integers including negative integers, zero and positive integers such as $(-(m-1), \ldots, -1, 0, 1, \ldots, m-1)$. For example, any binary number is represented in the SD number system by using three digits $(-1, 0, 1)$, and the three digits are indicated in a digital signal processor as $(1\ 1)_2$, $(0\ 0)_2$ and $(0\ 1)_2$, respectively. However, the three digits are represented in the following description as $(-1)_{SD}$, $(0)_{SD}$ and $(1)_{SD}$, respectively, for the sake of simplicity. Moreover, any number is placed in round brackets with suffix 2, SD or 10 depending upon the system.

In an ordinary binary arithmetic operation, a carry signal produced in a certain digit is sometimes propagated over a plurality of digits, and, for this reason, the calculation speed is lowered. However, if the arithmetic operation is executed in the SD system, every carry signal is merely transferred to the subsequent digit, then the arithmetic operation is increased in speed. The arithmetic operation in the SD number system consists of the following two stages. First, an intermediate carry and an intermediate sum are produced in every digit, and, then, the intermediate carry of the $n-1$ digit is added to the intermediate sum of the n digit for producing the final sum. When the intermediate carry is produced in the $n-1$ digit and, accordingly, propagated to the subsequent digit, the intermediate sum is produced in the n digit in such a manner that the intermediate carry is canceled therewith. In the SD number system with radix of "2", the intermediate carry is either $(1)_{SD}$ or $(-1)_{SD}$. When the n digit is by way of example supplied with the combination of the SD numbers $(0)_{SD}$ and $(1)_{SD}$ or the combination of the SD numbers $(0)_{SD}$ and $(-1)$, the intermediate sum is decided in such a manner that no carry is produced therein in consideration of the carry produced in the $n-1$ digit. For example, when the intermediate carry of $(1)_{SD}$ or $(-1)_{SD}$ is produced in the $n-1$ digit, the n digit produces the intermediate sum of $(-1)_{SD}$ or $(1)_{SD}$ for restricting the production of the carry in the n digit. In the second stage where the intermediate carry of the $n-1$ digit is added to the intermediate sum of the n digit, the final sum of the n digit is produced to be $(0)_{SD}$ as a result of the canceling principle. This means that no carry bit is propagated from the n digit to the $n+1$ digit. The intermediate sums and the intermediate carries are produced in all of the digits from $n=1$ to $n=k$ in this manner, and, accordingly, the two k bit input signals are added without any carry propagation beyond the subsequent digit. Table 1 is indicative of the adding operations in the SD number system with the radix of "2".

TABLE 1

| n digit of first input signal | n digit of second input signal | n-1 digit of both signals | intermediate carry | intermediate sum |
|---|---|---|---|---|
| 0 | 0 | — | 0 | 0 |

TABLE 1-continued

| n digit of first input signal | n digit of second input signal | n-1 digit of both signals | intermediate carry | intermediate sum |
|---|---|---|---|---|
| 0 | 1 | Neither is negative | 1 | −1 |
|   |   | At least one is negative | 0 | 1 |
| 0 | −1 | Neither is negative | 0 | −1 |
|   |   | At least one is negative | −1 | 1 |
| 1 | 1 | — | 1 | 0 |
| 1 | −1 | — | 0 | 0 |
| −1 | −1 | — | −1 | 0 |

Figure 2A:
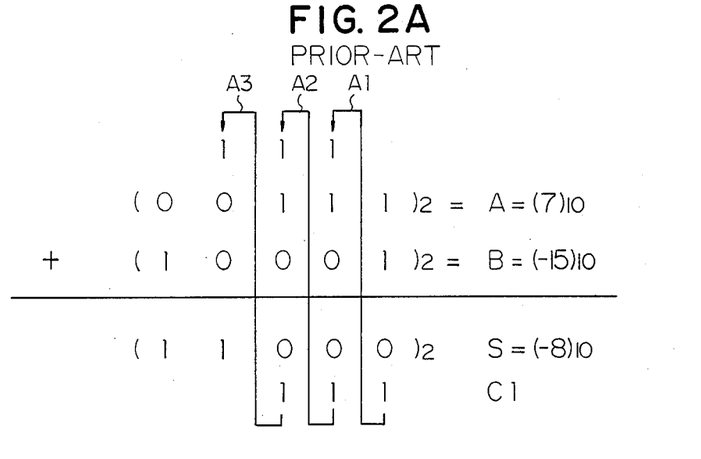
FIG. 2A is a view showing the arithmetic algorithm used for an adding operation on two's complements.
Figure 2B:
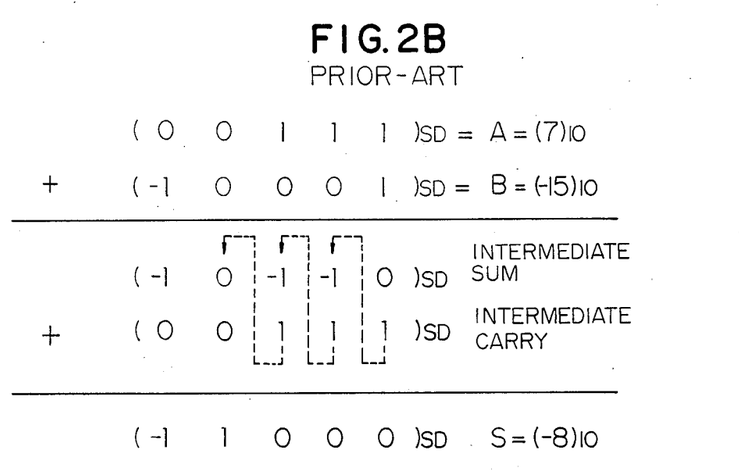
FIG. 2B is a view showing the arithmetic algorithm used for an adding operation on SD numbers.

For better understanding of the arithmetic operation in binary and SD number systems, an example is illustrated in FIGS. 2A and 2B. In FIG. 2A, two two's complements are added to each other, and an adding operation is carried out for two SD numbers corresponding to the two's complements in FIG. 2B. Assuming now that two decimal numbers A and B are represented as $(7)_{10}$ and $(-15)_{10}$, respectively, the decimal numbers A and B are converted into two two's complements (0 0 1 1 1)$_2$ and (1 0 0 0 1)$_2$, respectively and into two SD numbers (0 0 1 1 1)$_{SD}$ and (−1 0 0 0 1), respectively. As shown in FIG. 2A, a carry C1 is produced at the lowest digit in the binary adding operation and propagated over three digits as indicated by arrows A1, A2 and A3. However, in the adding operation of the SD numbers, the two's complements A and B are firstly converted into the SD numbers A and B and, then, added to each other. The size of any k bit two's complements CMPk ($x_k, \ldots, x_2, x_1$) is calculated as $$CMPk = -x_k * 2^{k-1} + \sum_{i=1}^{K-1} x_i * 2^{i-1} \qquad \text{(Eq. 3)}$$

where the operator (*) stands for the multiplication and $x_k$ is the sign bit. When the sign bit is "1" or the two's complement is a negative integer, the two's complement is converted into an SD number $(-1, x_{k-1}, \ldots, x_2, x_1)_{SD}$. However, if zero is given to the sign bit $x_k$ or the two's complement is a positive integer, the two's complement is converted into an SD number $(0, x_{k-1},$ converted into the two's complements which in turn are converted into the two SD numbers. In the adding operation of the two SD numbers, the intermediate sums and the intermediate carries are firstly produced in accordance with Table 1. Since each of the lowest digits is $(1)_{SD}$, the intermediate sum of $(0)_{SD}$ and the intermediate carry of $(1)_{SD}$ are produced therefrom. The second digits are $(1)_{SD}$ and $(0)_{SD}$, respectively, then the second digits produces the intermediate sum of $(-1)_{SD}$ and the intermediate carry of $(1)_{SD}$ in accordance with Table 1. Thus, the similar operations are carried out for the third digits to the highest digits, and, accordingly, the intermediate sums of $(-1 \, 0 \, -1 \, -1 \, 0)_{SD}$ and the intermediate carries of $(0 \, 0 \, 1 \, 1 \, 1)_{SD}$ are produced. Finally, the intermediate sums are added to the intermediate carries to yield the final sum of $(-1 \, 1 \, 0 \, 0 \, 0)_{SD}$. The SD number $(-1 \, 1 \, 0 \, 0 \, 0)_{SD}$ is equivalent to the decimal number of $(-8)_{10}$, then the calculation result is verified to be correct. As shown in Table 1, the carry propagation over two digits is prohibited from the adding operations by avoiding any combination of the intermediate sum and the intermediate carry, i.e., the combination of the intermediate sum of $(1)_{SD}$ and the intermediate carry of $(1)_{SD}$ and the combination of the intermediate sum of $(-1)_{SD}$ and the intermediate carry of $(-1)_{SD}$, and, for this reason, the carry is merely transferred to the subsequent digit as shown in FIG. 2B. This carry propagation is expected to be conducive to improvement in processing speed of the signal processor.

Figure 3:
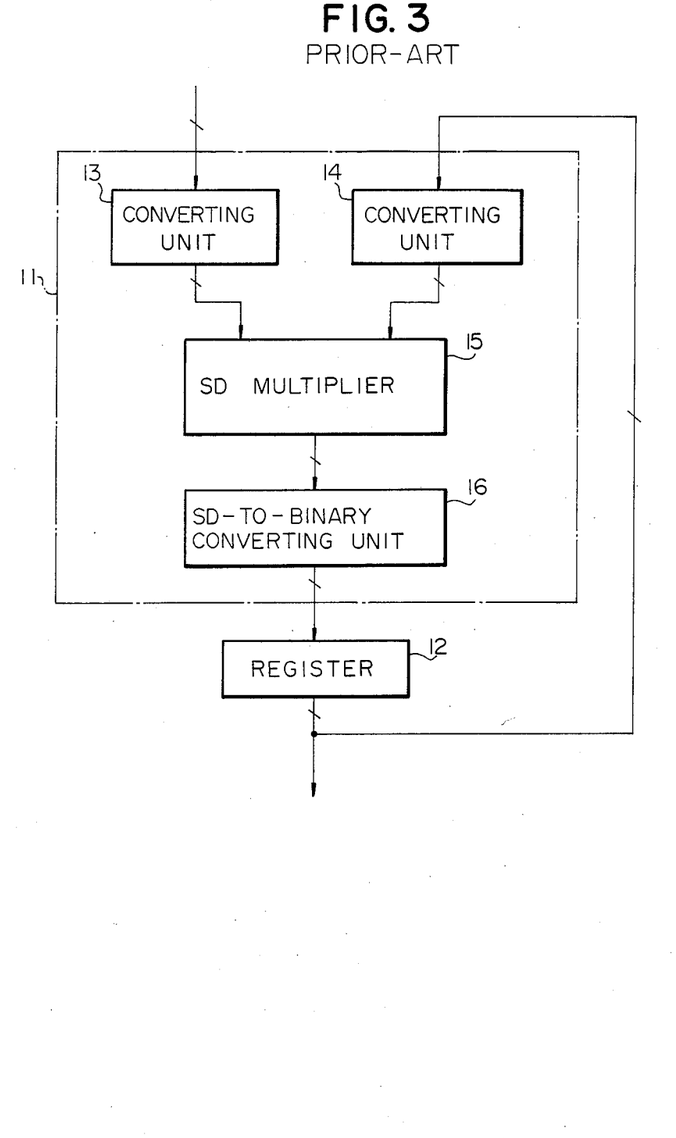
FIG. 3 is a block diagram showing the arrangement of another prior-art digital signal processor.

FIG. 3 shows the arrangement of another prior-art signal processor using the principles of the adding operation on the SD numbers. The signal processor shown in FIG. 3 largely comprises a binary multiplier 11 and a register 12, and the binary multiplier 11 performs an arithmetic operation on two SD numbers. For this purpose, the binary multiplier 11 is provided with two binary number-to-SD number converting units 13 and 14 one of which is supplied with a time series multi-bit input signal and the other of which is operative to convert a binary number fed back from the register 12. Both of the binary number-to-SD number converting units 13 and 14 are coupled in parallel to a multiplier 15 executing a multiplication for SD numbers ( which is hereinunder referred to an SD multiplier ), then two SD numbers are multiplied in accordance with Table 1. The product is of the SD number, then the SD multiplier is followed by an SD number-to-binary number converting unit 16. The SD multiplier 15 is relatively large in processing speed with respect to the partial-product producing and adding stage 3 forming part of the digital signal processor shown in FIG. 1 as reported in IEEE Journal of Solid-State Circuits, vol. SC-22, No. 1, February 1987, pages 28 to 34. The SD number-to-binary number converting unit 16 is similar to the final partial-product adding stage 4 as described in High-Speed Calculation Techniques for Computer, page 13, published by Modern Science Corporation, and, for this reason, the SD number-to-binary number converting unit 16 consumes a time period approximately equal to the processing time T2. The binary number-to-SD number converting units 13 and 14 consume a negligible amount of time. Assuming now that the SD multiplier 15 consumes a processing time T3 less than the processing time T1, the digital signal processor shown in FIG. 3, the total time period D5 calculated by Equation 4 is consumed by the digital signal processor with the SD multiplier 15 for the progression represented by Equation 1:

$$D5 = n \times (T2 + T3) \qquad \text{(Eq. 4)}$$

As described hereinbefore, the time period consumed by each binary number-to-SD number converting unit 13 or 14 is extremely short with respect to the processing times T2 and T3 ( see IEEE Journal of Solid-State Circuits, vol. SC-2, No. 1, February 1987, pages 28 to 34), and, for this reason, Equation 4 does not take into account of the time periods consumed by the converting units 13 and 14.

A problem is encountered in the prior-art digital signal processor shown in FIG. 1 is a low processing speed due to the carry propagation over a plurality of digits. When the digital - signal processor by way of example executes a calculation for a progression, the problem becomes serious, because the processor repeats the multiplication n times. The digital signal processor shown in FIG. 3 is slightly improved in processing speed by virtue of the SD multiplier 15, however, the SD number-to-binary number converting unit 16 consumes the time period approximately equal to that consumed by the final partial-product adding stage 4, so that the improvement in processing speed is limited.

SUMMARY OF THE INVENTION

It is therefore an important object of the present invention to provide a digital signal processor which is drastically improved in processing speed.

To accomplish these objects, the present invention proposes to feedback a calculation result represented by an SD number to one of the input ports of the SD multiplier without conversion into a binary number.

In accordance with the present invention, there is provided a high-speed digital signal processor comprising: a) an SD arithmetic unit having at least first and second input ports and operative to execute an arithmetic operation on signed digit numbers each consisting of a plurality of digits for producing a calculating result represented by a signed digit number; b) a signed digit number feeder supplied with a binary number and operative to supply the first input port with the signed digit number; c) a register operative to store the calculating result in a rewritable manner and having an output port coupled to the second input port; and d) a binary number discharger supplied with the calculation result and operative to discharge a binary number.

BRIEF DESCRIPTION OF THE DRAWINGS

The features and advantages of a high speed digital signal processor according to the present invention will be more clearly understood from the following description taken in conjunction with the accompanying drawings in which.

DESCRIPTION OF THE PREFERRED EMBODIMENTS

First Embodiment

Figure 4:
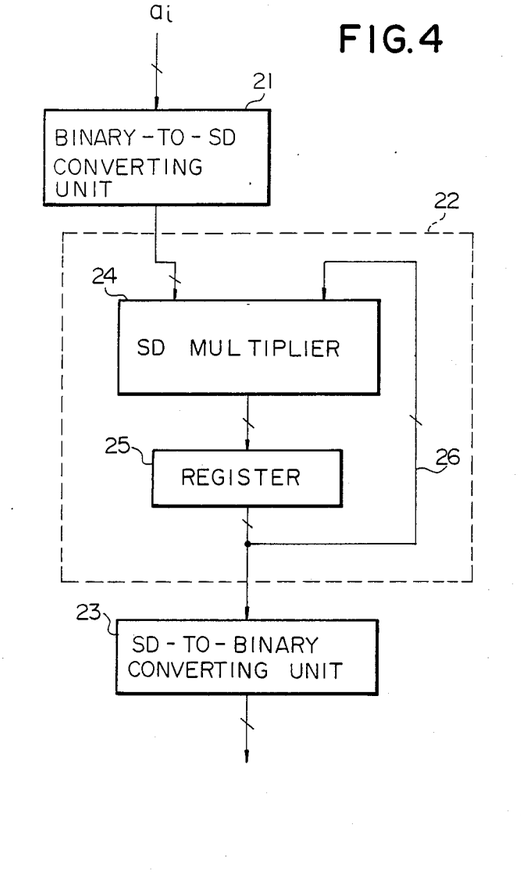
FIG. 4 is a block diagram showing the arrangement of a digital signal processor embodying the present invention.

Referring first to FIG. 4 of the drawings, there is shown a high-speed digital signal processor according to the present invention. The high-speed digital signal processor largely comprises a binary number-to-SD number converting unit 21, an SD arithmetic unit 22 and an SD number-to-binary number converting unit 23, and the SD arithmetic unit 22 has an SD multiplier 24 and a register 25. In this instance, a feedback loop 26 is provided between the output port of the register and one of the input ports of the SD multiplier 24.

Description is hereunder made for the operation of the digital signal processor on the assumption that the time series multi-bit input signals $a_0, \ldots, a_n$ is supplied to the binary-to-SD converting unit 21 for the arithmetic operation on the progression represented by Equation 1. The first and second multi-bit input signals $a_0$ and $a_1$ are successively converted into SD numbers by the binary number-to-SD number converting unit 21, and the SD multiplier 24 is supplied at the first input port thereof with the SD numbers and produces a first product which is stored in the register. The third multi-bit input signal $a_2$ is converted into an SD number and, then, supplied to the first input port of the SD multiplier 24. The first product stored in the register 25 is represented by an SD number and fed back to the second input port of the SD multiplier 24. With the first product and the third multi-bit input signal, the SD multiplier executes the multiplication to produce a second product. Thus, the SD multiplier 24 repeats the multiplication n times, i.e., multiplying an SD number represented by a multi-bit input signal by the product of the previous multiplication. Finally, the final product is fed to the SD-to-binary converting unit 23, and a binary number corresponding to the SD number is discharged from the SD-to-binary converting unit 23. Every multiplication is executed for the SD numbers, and, for this reason, the total time period D1 consumed by the processor shown in FIG. 4 is calculated as $$D1 = n \times T3 + T2 \qquad (Eq. 5)$$

Table 2 shows the respective total time periods consumed by the signal processors shown in FIGS. 1, 3 and 4 for comparison use.

TABLE 2

| D1 Processor in FIG. 4 | D4 Processor in FIG. 1 | D5 Processor in FIG. 3 |
|---|---|---|
| n × T3 + T2 | n × (T1 + T2) | n × (T3 + T2) |

As described before, the processing time T1 is greater than the processing time T3, then the total time period D4 is longer than the total time period D5. Further, a ratio D1 to D5 is given by Equation 6:

$$(D1/D5) = (n \times T3 + T2)/n(T3 + T2) \qquad (Eq. 6)$$

When n is "1" or the multiplication is executed once, the ratio D1 to D5 is "1", then, no discrepancy takes place between the signal processor according to the present invention and the prior-art signal processor. However, if the multiplication is repeated, n is increased in value, then the ratio D1 to D5 is decreased in value. Finally, the ratio is approximated as $T3/(T3 + T2)$. For example, if both of the multiplier and the multiplicand are of the sixteen bit signal. The SD multiplier 24 has forty stages of gates for each of the SD multiplier and the partial-product producing and adding stage, and, for this reason, the processing time T3 is approximately equal to the processing time T2. This results in that the signal processor according to the present invention consumes a half of the processing time of the prior-art signal processor.

Second Embodiment

Figure 5:
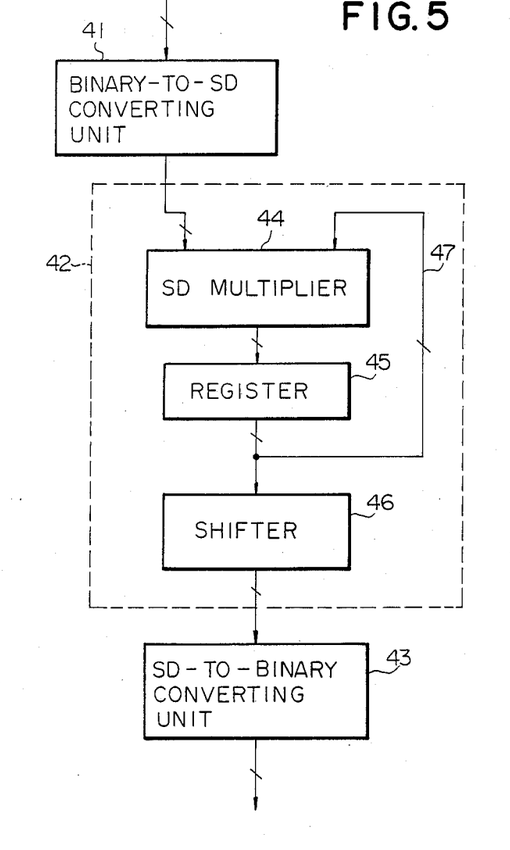
FIG. 5 is a block diagram showing the arrangement of another digital signal processor embodying the present invention.

Turning to FIG. 5 there is shown another digital signal processor embodying the present invention. The digital signal processor largely comprises a binary number-to-SD number converting unit 41, an SD arithmetic unit 42, and an SD number-to-binary number converting unit 43, and the SD arithmetic unit 42 has an SD multiplier 44, a register 45 and a shifter 46. In this instance, a feedback loop is provided between the register 45 and one of the input ports of the SD multiplier 44. The digital signal processor shown in FIG. 5 is provided with the shifter, and, for this reason, the product is shifted to either direction for adjusting the significance. This results in improvement in precision. For example, if the significant digits are limited to two, the multiplication 0.1×0.1 has no significance. However, if the significant digit is shifted to the lower side, the product has a significant digit.

Third Embodiment

Figure 6:
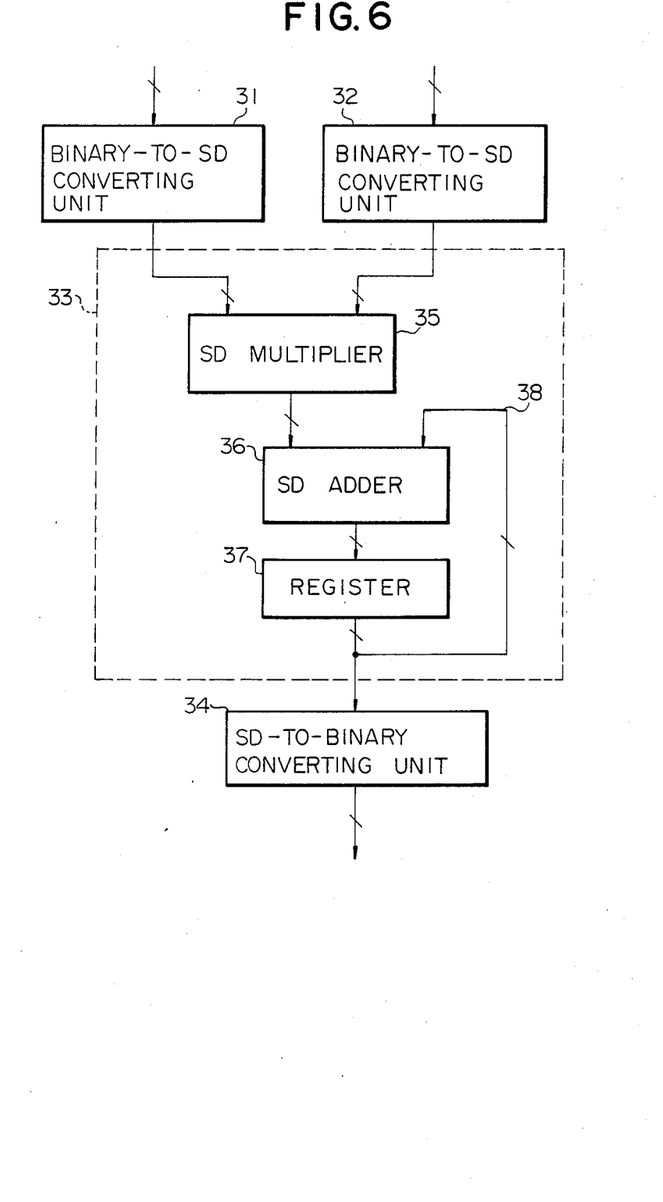
FIG. 6 is a block diagram showing the arrangement of still another digital signal processor embodying the present invention.

Turning to FIG. 6 of the drawings, there is shown still another digital signal processor according to the present invention. The digital signal processor largely comprises two binary number-to-SD number converting units 31 and 32, an SD arithmetic unit 33, and an SD number-to-binary number converting unit 34, and the SD arithmetic unit 33 has an SD multiplier 35, an SD adder 36 and a register 37. In this instance, a feedback loop is provided between the register 37 and one of the input ports of the SD adder 36. In this instance, the two binary number-to-SD number converting units 31 and 32 and the SD multiplier 35 as a whole constitute a signed digit number feeder.

In operation, two binary numbers are supplied to the binary number-to-SD number converting units 31 and 32 for converting into SD numbers, respectively, and the SD numbers are multiplied by each other in the SD multiplier 35. The SD multiplier 35 repeats the multiplication twice, then two products are supplied in succession to the SD adder 36 for producing a first sum. The first sum is stored in the register 37 and, then, fed back to the SD adder through the feedback loop 38. With the third product, the SD adder 36 executes the adding operation on the third product and the first sum for producing a second sum. Thus, the adding operation is repeated until the final multi-bit input signal. Finally, the final product-sum is fed to the SD-to-binary converting unit 34 for converting into a binary number corresponding to the SD number.

Although particular embodiments of the present invention have been shown and described, it will be obvious to those skilled in the art that various changes and modifications may be made without departing from the spirit and scope of the present invention. For example, the SD arithmetic unit may execute a subtraction, or any arithmetic operation on absolute values of SD numbers. Moreover, the present invention is applicable to the digital signal processor executing an arithmetic operation on SD numbers with any radix such as, for example, SD numbers with radix of "3". In this application, each SD number is represented by a combination of $(-2)_{SD}$, $(-1)_{SD}$, $(0)_{SD}$, $(1)_{SD}$ and $(2)_{SD}$.

What is claimed is:

1. A high-speed digital signal processor comprising:
   (a) a Signed Digit (SD) arithmetic unit having at least first and second input ports and operative to execute an arithmetic operation on signed digit numbers each consisting of a plurality of digits for producing a calculating result represented by a signed digit number;
   (b) a signed digit number feeder supplied with a binary number and operative to supply said first input port with a signed digit number;
   (c) a register operative to store said calculating result in a rewritable manner and having an output port coupled to said second input port; and
   (d) a binary number discharger supplied with the calculating result and operative to discharge a binary number.

2. A high-speed digital signal processor as set forth in claim 1, in which said SD arithmetic unit executes a multiplication.

3. A high-speed digital signal processor as set forth in claim 2, in which said signed digit number feeder is formed by a binary number-to-SD number converting unit.

4. A high-speed digital signal processor as set forth in claim 3, in which said binary number discharger is formed by an SD number-to-binary number converting unit.

5. A high-speed digital signal processor as set forth in claim 1, in which said SD arithmetic unit executes an adding operation.

6. A high-speed digital signal processor as set forth in claim 5, in which said signed digit number feeder comprises two binary number-to-SD number converting units respectively supplied with binary numbers and operative to convert the binary numbers into an signed digit numbers, and an SD multiplier supplied with the signed digit numbers and operative to produce a product represented by said signed digit number.

7. A high-speed digital signal processor as set forth in claim 6, in which said binary number discharger is formed by an SD number-to-binary number converting unit.

8. A high-speed digital signal processor comprising:
   (a) a Signed Digit (SD) multiplier having first and second input ports and operative to execute a multiplication on signed digit numbers each consisting of a plurality of digits for producing a product represented by a signed digit number;
   (b) a binary number-to-SD number converting unit supplied with a binary number and operative to supply said first input port with a signed digit number;
   (c) a register operative to store said product in a rewritable manner and having an output port coupled to said second input port; and
   (d) an SD number-to-binary number converting unit supplied with the product from said register and operative to discharge a binary number.

9. A high-speed digital signal processor comprising:
   (a) a Signed Digit (SD) multiplier having first and second input ports and operative to execute a multiplication on signed digit numbers each consisting of a plurality of digits for producing a product represented by a signed digit number;
   (b) a binary number-to-SD number converting unit supplied with a binary number and operative to supply said first input port with the signed digit number;
   (c) a register operative to store said product in a rewritable manner and having an output port coupled to said second input port;
   (d) a shifter having an output port and an input port coupled to the output part of said register and operative to shift the product; and
   (e) an SD number-to-binary number converting unit having an input port coupled to the output port of said shifter and operative to discharge a binary number.

10. A high-speed digital signal processor comprising:
    (a) a Signed Digit (SD) multiplier having first and second input ports and operative to execute a multiplication on signed digit numbers each consisting of a plurality of digits for producing a product represented by a signed digit number;

(b) first and second binary number-to-SD number converting units supplied with respective binary numbers and operative to supply said first and second input ports with the signed digit numbers;

(c) an SD adding unit having third and fourth ports and operative to execute an adding operation on SD numbers supplied to the third and fourth ports for producing a sum, said third port being supplied with the product from said SD multiplier;

(d) a register operative to store said sum in a rewritable manner and having an output port coupled to said forth input port; and (e) an SD number-to-binary number converting unit having an input port coupled to the output port of said register and operative to discharge a binary number.

11. A high-speed digital signal processor comprising:

(a) a Signed Digit (SD) arithmetic unit having at least first and second input ports and operative to execute a multiplication operation on signed digit numbers each consisting of a plurality of digits for producing a calculating result represented by a signed digit number;

(b) a signed digit number feeder supplied with a binary number and operative to supply said first input port with a signed digit number, said signed digit number feeder formed by a binary number-to-SD number converting unit;

(c) a register operative to store said calculating result in a rewritable manner and having an output port coupled to said second input port; and (d) a binary number discharger supplied with the calculating result and operative to discharge a binary number, said binary number discharger comprising a shifter having an input port coupled to the output port of said register and having an output port, and an SD number-to-binary number converting unit having an input port coupled to said output port of the shifter.

* * * * *